(12) United States Patent
Chiu et al.

(10) Patent No.: US 12,523,847 B2
(45) Date of Patent: Jan. 13, 2026

(54) OPTICAL LENS COMPRISING FOUR LENSES HAVING AN EFFECTIVE FOCAL LENGTH

(71) Applicant: Young Optics Inc., Hsinchu (TW)

(72) Inventors: Wei-Ting Chiu, Hsinchu (TW); Chien-Hsiung Tseng, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 737 days.

(21) Appl. No.: 17/892,146

(22) Filed: Aug. 22, 2022

(65) Prior Publication Data

US 2023/0138830 A1    May 4, 2023

(30) Foreign Application Priority Data

Oct. 28, 2021  (TW) .................................. 110140059

(51) Int. Cl.
 *G02B 9/34*    (2006.01)
(52) U.S. Cl.
 CPC ..................................... *G02B 9/34* (2013.01)
(58) Field of Classification Search
 None
 See application file for complete search history.

(56) References Cited

U.S. PATENT DOCUMENTS

| | | |
|---|---|---|
| 5,812,309 A | 9/1998 | Thoma et al. |
| 9,841,585 B2 | 12/2017 | Li et al. |
| 2004/0196574 A1 | 10/2004 | Tanaka et al. |
| 2018/0045952 A1* | 2/2018 | Chae ........................ G03B 9/02 |

FOREIGN PATENT DOCUMENTS

| | | | | |
|---|---|---|---|---|
| CN | 107907976 A | * | 4/2018 | ............... G02B 1/00 |
| CN | 112230369 | | 1/2021 | |
| CN | 112925085 B | * | 11/2023 | ......... G02B 13/0015 |
| TW | I664442 | | 7/2019 | |

* cited by examiner

*Primary Examiner* — Paul C Lee
(74) *Attorney, Agent, or Firm* — JCIPRNET (57) ABSTRACT

An optical lens includes an aperture, a first lens, a second lens, a third lens, and a fourth lens sequentially in a direction. One of the first lens and the second lens has positive refracting power, and the other has negative refracting power. The third lens has refracting power, and is a lens with a largest diameter in the optical lens. The fourth lens has the refracting power. The four lenses are made of glass. For light having a wavelength of 1315 nm, a transmittance of the optical lens is greater than ninety percent.

20 Claims, 6 Drawing Sheets

OPTICAL LENS COMPRISING FOUR LENSES HAVING AN EFFECTIVE FOCAL LENGTH

CROSS-REFERENCE TO RELATED APPLICATION

This application claims the priority benefit of Taiwan application serial no. 110140059, filed on Oct. 28, 2021. The entirety of the above-mentioned patent application is hereby, incorporated by reference herein and made a part of this specification.

BACKGROUND

Technical Field

The disclosure relates to an optical device, and more particularly, to an optical lens.

Description of Related Art

With the increasing application of optical lenses, the configuration of the optical lenses in various intelligent assistance systems such as intelligent electronic products, in-vehicle devices, and identification systems is a major trend in future technological development. In order to meet different application requirements, the optical lenses with different characteristics have been further developed.

For example, in systems such as automatic driving or driving assistance, combined with sensors, radars, and machine vision technology, the changes in the environment outside the car may be sensed and analyzed. In terms of configuration, how to provide an appropriate optical lens for the light source and integrate the optical lens with related equipment is an issue to be solved.

SUMMARY

The disclosure provides an optical lens, which may maintain good optical performance under the condition of a smaller number of lenses and a shorter system length.

An optical lens according to an embodiment of the disclosure includes an aperture, a first lens, a second lens, a third lens, and a fourth lens sequentially in a direction. One of the first lens and the second lens has positive refracting power, and the other has negative refracting power. The third lens has refracting power, and is the lens with the largest diameter in the optical lens. The fourth lens has the refracting power. The optical lens meets a condition: a ratio of EFL to LT ranges between 0.45 and 0.65, where EFL is an effective focal length of the optical lens, and LT is a length of the optical lens on an optical axis. A ratio of an inner diameter of the aperture to a diameter of the third lens ranges between 0.3 and 0.5. The four lenses are made of glass. In addition, for light with a wavelength of 1315 nanometers (nm), a transmittance of the optical lens is greater than ninety percent.

An optical lens includes an aperture, a first lens, a second lens, a third lens, and a fourth lens sequentially along a direction. The four lenses are made of glass, and all have refracting power. One of the first lens and the second lens has positive refracting power, and the other has negative refracting power. A distance from the aperture to the first lens is greater than 7 mm. A ratio of an inner diameter of the aperture to a diameter of the third lens ranges between 0.3 and 0.5. In addition, for light with a wavelength of 1315 nm, a transmittance of the optical lens is greater than ninety percent.

Based on the above, the optical lens in the embodiments of the disclosure may still provide good optical performance when the number of the lenses is reduced and the system length is shortened by meeting the above component characteristics and configuration conditions. Therefore, the optical lens in the embodiments of the disclosure may have lower tolerance sensitivity, and the shorter system length may also facilitate the configuration of the optical lens.

In order for the aforementioned features and advantages of the disclosure to be more comprehensible embodiments accompanied with drawings are described in detail below.

DETAILED DESCRIPTION OF DISCLOSED EMBODIMENTS

Figure 1:
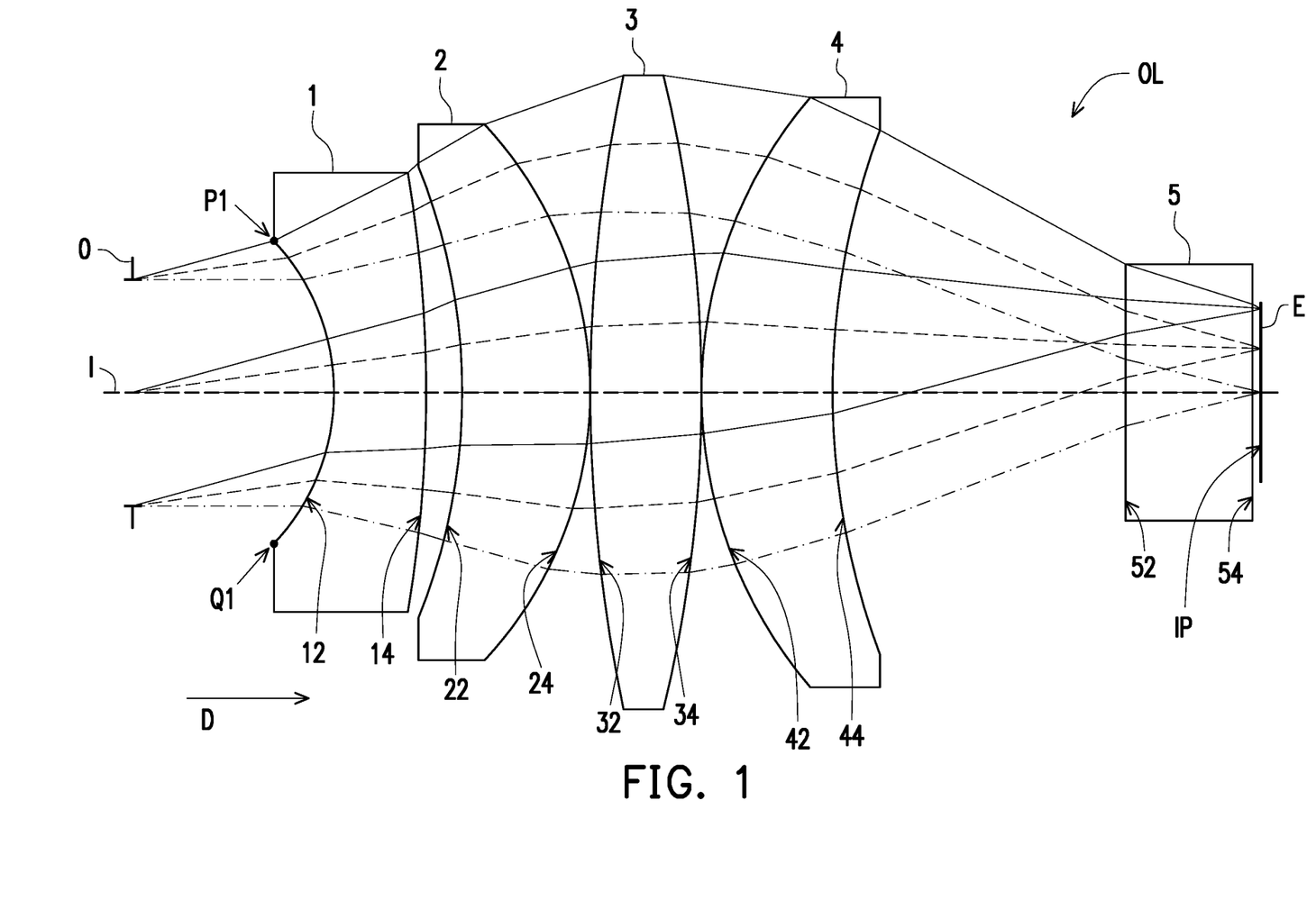
FIG. 1 is a schematic view of an optical lens according to the first embodiment of the disclosure.
Figure 2A:
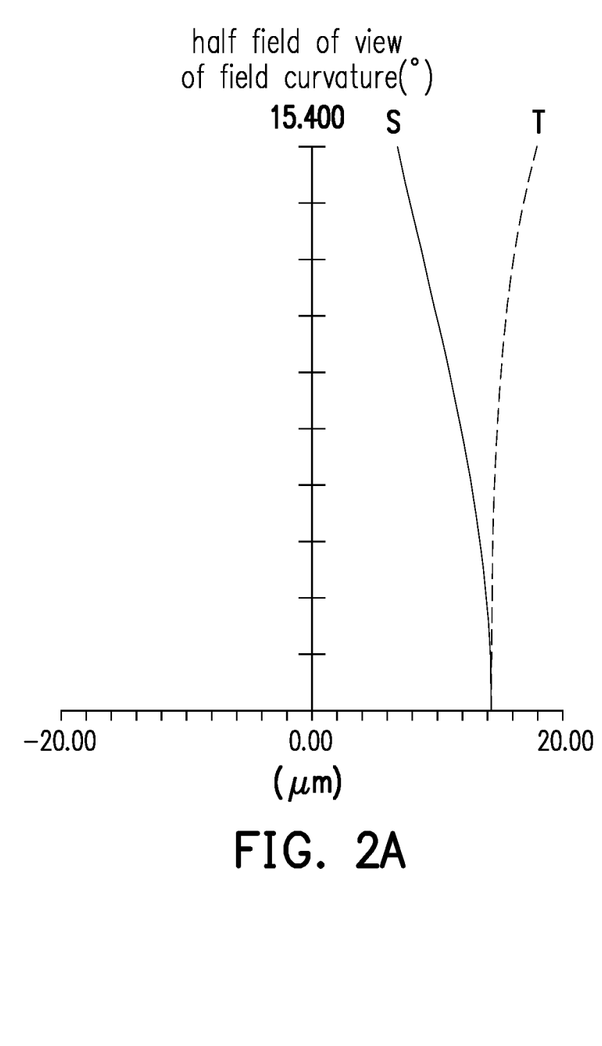
FIGS. 2A and 2B are views of various aberrations of the optical lens in the first embodiment.
Figure 2B:
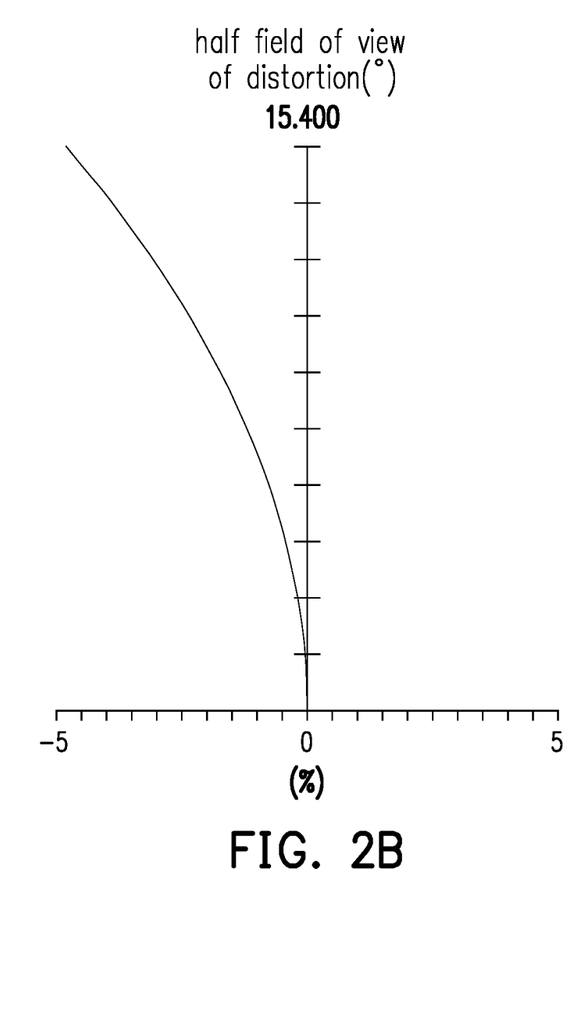

FIG. 1 is a schematic view of an optical lens according to the first embodiment of the disclosure. FIGS. 2A and 2B are views of various aberrations of the optical lens in the first embodiment. Referring to FIG. 1 first, an optical lens OL includes an aperture 0, a first lens 1, a second lens 2, a third lens 3, and a fourth lens 4 sequentially in a direction D. The direction D may be the direction from a magnification side to a reduction side of the optical lens OL. The optical lens OL in this embodiment may be used with a light source E disposed on a reduction side of the fourth lens 4. The light source E may be disposed on an imaging plane IP of the optical lens OL. The optical lens OL may be used with a prism 5 disposed between the fourth lens 4 and the light source E at the same time, but the disclosure is not limited thereto. In this embodiment, the first lens 1, the second lens 2, the third lens 3, the fourth lens 4, and the prism 5 each have magnification side surfaces 12, 22, 32, 42, and 52 facing towards the magnification side and allowing light to pass through and reduction side surfaces 14, 24, 34, 44, and 54 facing towards the reduction side and allowing the light to pass through.

The light source E may emit divergent light with an angle. In this embodiment, the light source E may be a laser light source, such as an infrared laser light source, but the disclosure is not limited thereto. The light source E may also be a light valve module or a light source module in other suitable forms. The light emitted from light source E may sequentially pass through the prism 5, the fourth lens 4, the third lens 3, the second lens 2, the first lens 1, and the aperture 0 in a direction opposite to the direction D to be projected towards the magnification side of the optical lens OL. For the light having a wavelength of 1315 nm, a transmittance of the optical lens OL in this embodiment is greater than ninety percent.

In detail, the first lens 1 is a glass lens and a spherical lens. The first lens 1 has negative refracting power, and is a convex-concave lens. In the first lens 1, the magnification side surface 12 is a concave surface, and the reduction side surface 14 is a convex surface. Both the magnification side surface 12 and the reduction side surface 14 of the first lens 1 are spheric surfaces, but the disclosure is not limited thereto.

The second lens 2 is the glass lens and the spherical lens. The second lens 2 has positive refracting power, and is the concave-convex lens. In the second lens 2, the magnification side surface 22 is the concave surface, and the reduction side surface 24 is the convex surface. Both the magnification side surface 22 and the reduction side surface 24 of the second lens 2 are the spheric surfaces, but the disclosure is not limited thereto.

The third lens 3 is the glass lens and the spherical lens. The third lens 3 has the positive refracting power, and is a biconvex lens. In the third lens 3, the magnification side surface 32 is the convex surface, and the reduction side surface 34 is the convex surface. Both the magnification side surface 32 and the reduction side surface 34 of the third lens 3 are the spheric surfaces, but the disclosure is not limited thereto.

The fourth lens 4 is the glass lens and the spherical lens. The fourth lens 4 has the positive refracting power, and is the concave-convex lens. In the fourth lens 4, the magnification side surface 42 is the convex surface, and the reduction side surface 44 is the concave surface. Both the magnification side surface 42 and the reduction side surface 44 of the fourth lens 4 are spheric surfaces, but the disclosure is not limited thereto. However, in another embodiment, the fourth lens may have the negative refracting power according to design requirements, and still achieve certain optical performance.

In this embodiment, the number of lenses in the optical lens OL is four. In this embodiment, one of the first lens 1 and the second lens 2 has the positive refracting power, and the other has the negative refracting power. The third lens 3 has refracting power, and is the lens with a largest diameter in the optical lens OL. The fourth lens 4 has the refracting power. The first lens 1, the second lens 2, the third lens 3, and the fourth lens 4 are all made of glass. In this embodiment, the aperture 0 is disposed on a magnification side of the first lens 1.

In the first embodiment of the disclosure, EFL of the optical lens OL is 16.75 millimeters (mm), wherein EFL is an effective focal length of the optical lens OL. An F-number (F #) is 1.40. A field of view (FOV) is 30.8 degrees. TTL is 60.0 mm, wherein TTL is a distance from the aperture 0 to an imaging plane IP of the optical lens. A maximum image height is 4.4 mm. The above effective focal length is a focal length of the optical lens OL at the wavelength of 1315 nm, and the total system length is a distance from the aperture 0 to the imaging plane IP of the optical lens OL on an optical axis I.

The optical lens OL in this embodiment meets the following conditions. The F-number of the optical lens OL is greater than or equal to 1.4. The field of view (FOV) of the optical lens OL is between 50 degrees and 20 degrees. In an embodiment, the field of view (FOV) of the optical lens OL is between 50 degrees and 25 degrees. In another embodiment, the field of view (FOV) of the optical lens OL is between 50 degrees and 30 degrees. TTL of the optical lens OL ranges between 55 mm and 65 mm. The focal length of the optical lens OL at the wavelength of 1315 nm ranges between 16 mm and 25 mm. The focal length of the optical lens OL at the wavelength of 1315 nm ranges preferably between 16 mm and 20 mm. The focal length of the optical lens OL at the wavelength of 1315 nm ranges more preferably between 1.6.5 mm and 17 mm. In addition, the optical lens OL in this embodiment is telecentric at an end of the optical lens OL adjacent to the fourth lens 4. That is, the optical lens OL in this embodiment is telecentric at the reduction side of the optical lens OL.

Other detailed optical data of the optical lens OL in the first embodiment of the disclosure are shown in Table 1 below. The column of "spacing/thickness" lists distances between each of the surfaces, and the distances indicate a thickness of each of optical elements on the optical axis I, or the distance between each of the optical elements and the surface of the next optical element on the optical axis I. For example, in the row of "12", the "spacing/thickness" indicates a thickness of the first lens 1 on the optical axis I, and in the row of "14", the "spacing/thickness" indicates a distance between the first lens 1 and the second lens 2 on the optical axis I, and the rest may be derived by analog. The column of "radius" lists a radius of each of the surfaces of the optical elements. For example, in the row of "aperture 0", the "radius" indicates a half of an inner diameter of the aperture 0. In the row "12", the "radius" indicates a half of a diameter of the magnification side surface 12 of the first lens 1, and in the row of "14", the "radius" indicates a half of a diameter of the reduction side surface 14 of the first lens 1, and the rest may be derived by analog. The "diameter" mentioned here refers to a distance between turning points on both sides of an optical center. In this embodiment, the diameter of the magnification side surface 12 of the first lens 1 is the distance between turning points P1 and Q1 at which a curved surface of the magnification side surface 12 extends from the optical center to edges of the lenses on both sides and turns.

TABLE 1

The first embodiment

| Serial numbers of surfaces | Radius of curvature (mm) | Spacing/ thickness (mm) | Refractive index | Abbe number | Radius (mm) | Remark |
| --- | --- | --- | --- | --- | --- | --- |
|  | infinite | 10.679 |  |  | 6.000 | aperture 0 |
| 12 | −11.838 | 4.894 | 1.70 | 55.50 | 8.067 | first lens 1 |
| 14 | −69.793 | 1.916 |  |  | 11.670 |  |
| 22 | −32.672 | 6.812 | 2.00 | 29.10 | 12.134 | second lens 2 |
| 24 | −20.810 | 0.100 |  |  | 14.232 |  |
| 32 | 80.145 | 5.846 | 2.00 | 29.10 | 16.712 | third lens 3 |
| 34 | −68.865 | 0.100 |  |  | 16.814 |  |
| 42 | 24.427 | 6.909 | 2.00 | 29.10 | 15.670 | fourth lens 4 |

TABLE 1-continued

The first embodiment

| Serial numbers of surfaces | Radius of curvature (mm) | Spacing/ thickness (mm) | Refractive index | Abbe number | Radius (mm) | Remark |
|---|---|---|---|---|---|---|
| 44 | 41.268 | 15.536 | | | 14.007 | |
| 52 | infinite | 7.157 | | | 6.827 | prism 5 |
| 54 | infinite | 0.050 | | | 4.707 | |
| IP | infinite | 0.000 | | | 4.402 | light source E |

The optical lens OL in this embodiment meets the following condition. A ratio of EFL to LT ranges between 0.45 and 0.65. EFL is an effective focal length of the optical lens OL. LT is a length of the optical lens OL on the optical axis I, that is, a total length from the magnification side surface 12 of the first lens 1 to the reduction side surface 44 of the fourth lens 4 on the optical axis I. In an embodiment, a ratio of EFL to LT ranges between 0.47 and 0.65. In another embodiment, a ratio of EFL to LT ranges between 0.47 and 0.64. In this embodiment, LT is 26.577 mm, and the ratio of EFL to LT is 0.630. The optical lens OL in this embodiment further meets the following condition. LT ranges between 25 mm and 35 mm.

In this embodiment, a ratio of the inner diameter of the aperture 0 to the diameter of the third lens 3 ranges between 0.3 and 0.5. A larger diameter in the diameters of the magnification side surface 32 and the reduction side surface 34 of the third lens 3 is used as the diameter of the third lens 3. In this embodiment, the ratio of the inner diameter of the aperture 0 to the diameter of the third lens 3 is 0.357. In addition, in this embodiment, a distance (FWD) from the aperture 0 to the first lens 1 is greater than 7 mm. The distance from the aperture 0 to the first lens 1 is the distance from the aperture 0 to the magnification side surface 12 of the first lens 1 on optical axis I. The optical lens OL in this embodiment further meets the following conditions. A ratio of the distance (FWD) from the aperture 0 to the first lens 1 to LT ranges between 0.2 and 0.6, and the ratio ranges preferably between 0.24 and 0.42, and more preferably between 0.4 and 0.42. In this embodiment, the distance (FWD) from the aperture 0 to the first lens 1 is 10.679 mm, and the ratio of the distance (FWD) from the aperture 0 to the first lens 1 to LT is 0.402.

The optical lens OL in this embodiment further meets the following condition. A distance (BFL) from the fourth lens 4 to the imaging plane IP of the optical lens OL is greater than 7 mm. The distance from the fourth lens 4 to the imaging plane IP of the optical lens OL is a distance from the reduction side surface 44 of the fourth lens 4 to the imaging plane IP on the optical axis I. In this embodiment, the distance from the fourth lens 4 to the imaging plane IP of the optical lens OL is 22.743 mm.

The optical lens OL in this embodiment meets the following condition. The four lenses (the first lens 1, the second lens 2, the third lens 3, and the fourth lens 4) of the optical lens OL include three lenses with refractive indices greater than 1.6. In this embodiment, the refractive indices of the first lens 1, the second lens 2, the third lens 3, and the fourth lens 4 are all greater than 1.6. Furthermore, the four lenses of the optical lens OL include three lenses with the refractive indices greater than 1.9. In this embodiment, the refractive indices of the second lens 2, the third lens 3, and the fourth lens 4 are all greater than 1.9.

Referring to FIGS. 2A and 2B, FIGS. 2A and 2B are views of various aberrations of the optical lens in the first embodiment. FIG. 2A illustrates a field curvature aberration in a sagittal direction (marked as S) and a field curvature aberration in a tangential direction (marked as T) on the imaging plane IP when the wavelength is 1315 nm in the first embodiment. FIG. 2B illustrates a distortion aberration on the imaging plane IP when the wavelength is 1315 nm in the first embodiment.

In this embodiment, for light with the wavelength of 1315 nm, an absolute vale of aberration of field curvature on an imaging plane IP of the optical lens OL is less than 20 μm. The field curvature aberration in FIG. 2A indicates that the field curvature aberration of the wavelength in the entire field of view falls within ±18 micrometers (μm). The distortion aberration in FIG. 2B shows that the distortion aberration of the first embodiment is maintained within a range of ±5%. In light of the above, in this embodiment, the optical performance is still good when the number of lenses is reduced to 4, and the system length is shortened to 60.0 mm.

Relevant optical values of the optical lens OL in this embodiment are listed in detail in Table 4 attached later.

Figure 3:
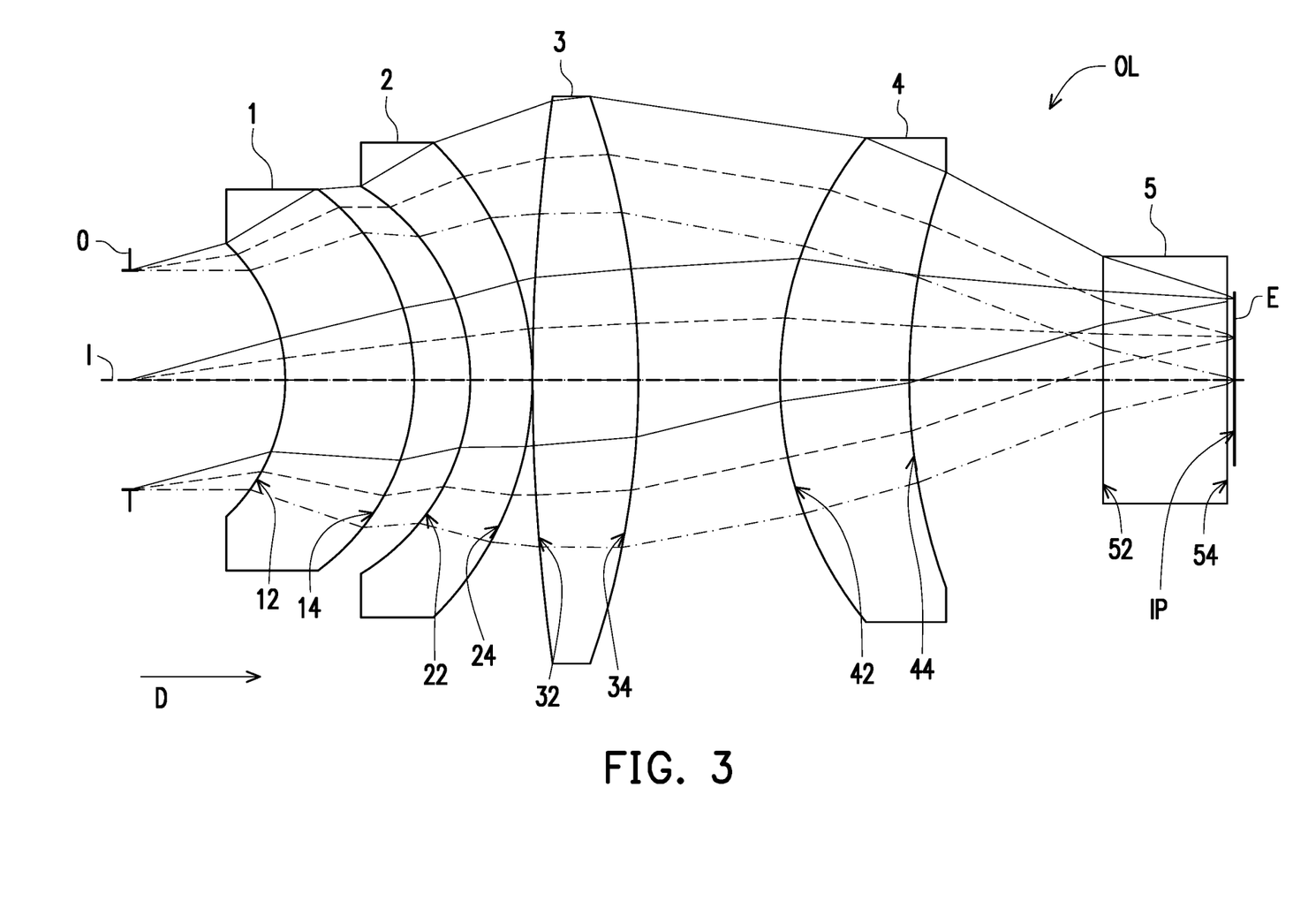
FIG. 3 is a schematic view of an optical lens according to the second embodiment of the disclosure.
Figure 4A:
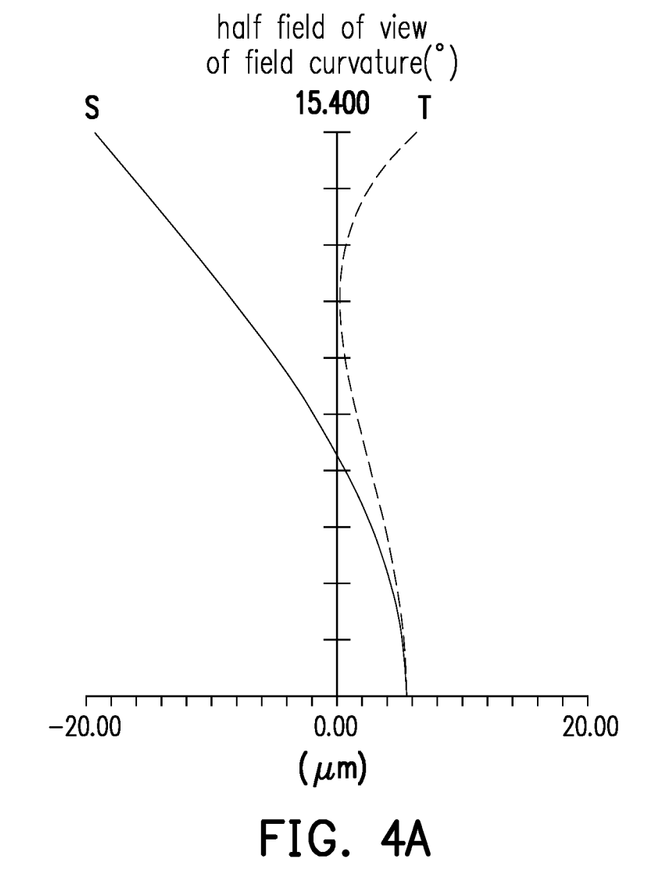
FIGS. 4A and 4B are views of various aberrations of the optical lens in the second embodiment.
Figure 4B:
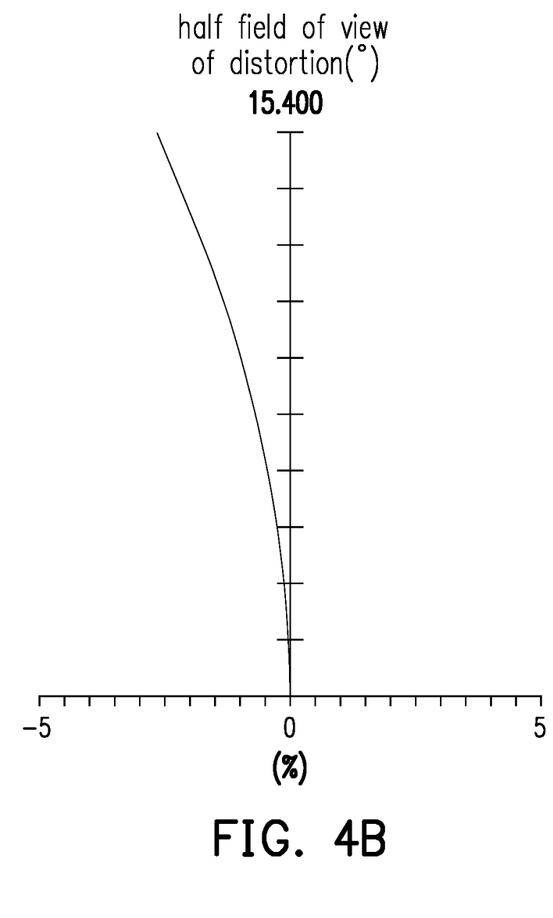

FIG. 3 is a schematic view of an optical lens according to the second embodiment of the disclosure. FIGS. 4A and 4B are views of various aberrations of the optical lens in the second embodiment. Referring to FIG. 3 first, the second embodiment of the optical lens OL of the disclosure is substantially similar to the first embodiment. A difference between the two is that the first lens 1 has the positive refracting power, and is the concave-convex lens. The magnification side surface 12 in the first lens 1 is the concave surface, and the reduction side surface 14 is the convex surface. The second lens 2 has the negative refracting power, and is the convex-concave lens. The magnification side surface 22 in the second lens 2 is the concave surface, and the reduction side surface 24 is the convex surface. In addition, parameters such as the optical data and the spacing of each of the elements of the first lens 1, the second lens 2, the third lens 3, and the fourth lens 4 are not completely the same.

In the second embodiment of the disclosure, EFL of the optical lens OL is 16.86 mm. The F-number (F #) is 1.41. The field of view (FOV) is 30.8 degrees. TTL is 60.2 mm. The maximum image height is 4.4 mm. Other detailed optical data of the optical lens OL in the second embodiment of the disclosure are shown in Table 2 below.

TABLE 2

The second embodiment

| Serial numbers of surfaces | Radius of curvature (mm) | Spacing/ thickness (mm) | Refractive index | Abbe number | radius (mm) | Remark |
|---|---|---|---|---|---|---|
|  | infinite | 8.440 |  |  | 6.000 | aperture 0 |
| 12 | −10.328 | 7.000 | 2.00 | 29.10 | 7.450 | first lens 1 |
| 14 | −12.948 | 3.173 |  |  | 10.413 |  |
| 22 | −12.427 | 3.285 | 1.73 | 22.60 | 10.625 | second lens 2 |
| 24 | −18.218 | 0.100 |  |  | 12.910 |  |
| 32 | 110.188 | 5.686 | 2.00 | 29.10 | 15.216 | third lens 3 |
| 34 | −46.501 | 7.747 |  |  | 15.414 |  |
| 42 | 20.987 | 7.000 | 2.00 | 29.10 | 13.213 | fourth lens 4 |
| 44 | 33.383 | 10.561 |  |  | 11.309 |  |
| 52 | infinite | 7.155 |  |  | 6.763 | prism 5 |
| 54 | infinite | 0.050 |  |  | 4.707 |  |
| IP | infinite | 0.000 |  |  | 4.399 | light source E |

In this embodiment, LT is 33.992 mm. The ratio of EFL to LT is 0.496. In this embodiment, the ratio of the inner diameter of the aperture 0 to the diameter of the third lens 3 is 0.389. In addition, in this embodiment, the refractive indices of the first lens 1, the second lens 2, the third lens 3, and the fourth lens 4 are all greater than 1.6, and the refractive indices of the first lens 1, the third lens 3, and the fourth lens 4 are all greater than 1.9.

Referring to FIGS. 4A and 4B, the field curvature aberration in FIG. 4A indicates that the field curvature aberration of the wavelength in the entire field of view falls within ±20 µm. The distortion aberration in FIG. 4B shows that the distortion aberration of the second embodiment is maintained within a range of ±6%. In light of the above, in this embodiment, the optical performance is still good when the number of lenses is reduced to 4, and the system length is shortened to 60.2 mm.

The relevant optical values of the optical lens OL in this embodiment are listed in detail in Table 4 attached later.

Figure 5:
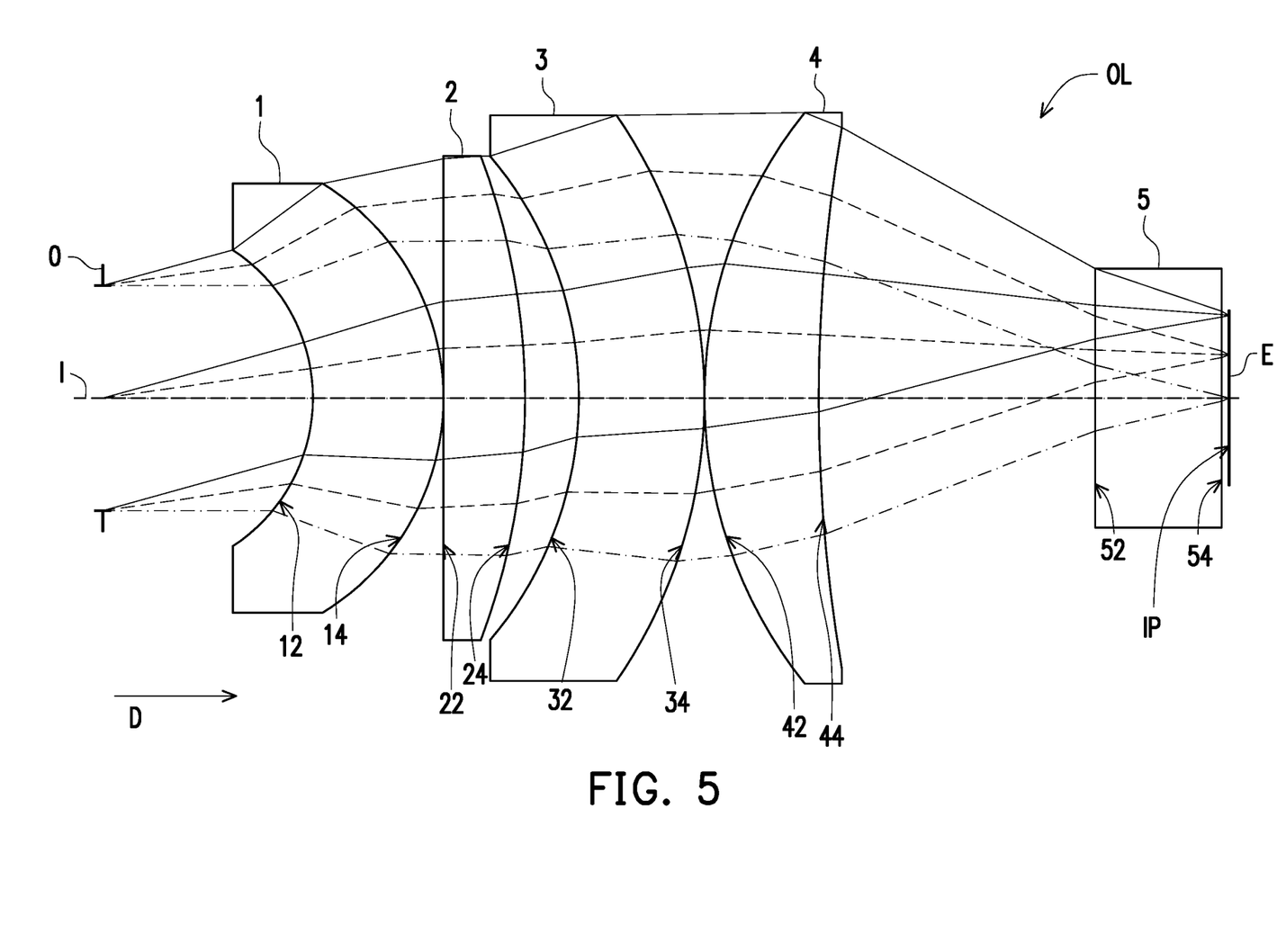
FIG. 5 is a schematic view of an optical lens according to the third embodiment of the disclosure.
Figure 6A:
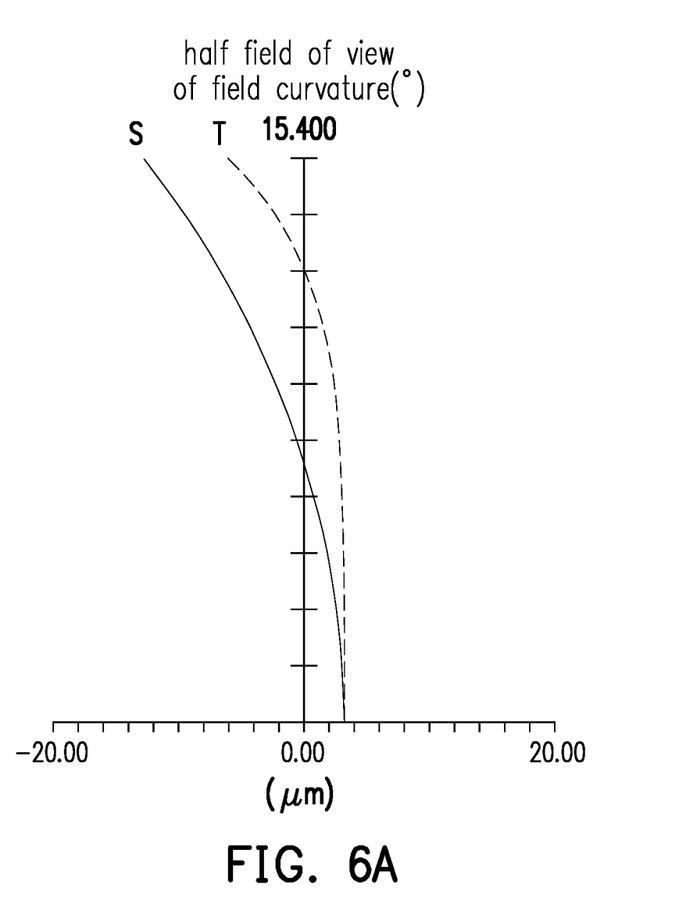
FIGS. 6A and 6B are views of various aberrations of the optical lens in the third embodiment
Figure 6B:
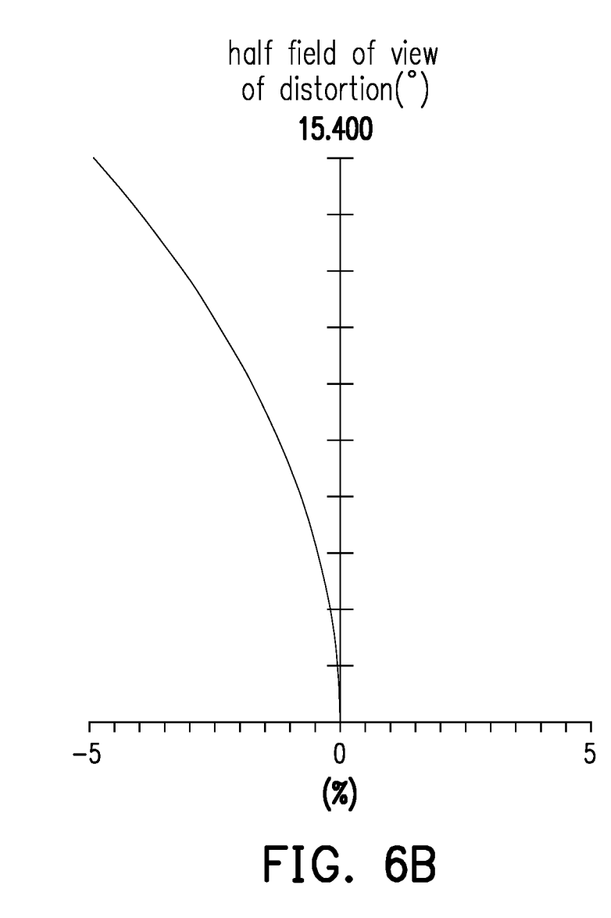

FIG. 5 is a schematic view of an optical lens according to the third embodiment of the disclosure. FIGS. 6A and 6B are views of various aberrations of the optical lens in the third embodiment. Referring to FIG. 5 first, the third embodiment of the optical lens OL of the disclosure is substantially similar to the first embodiment. A difference between the two is that the third lens 3 has the negative refracting power, and is the convex-concave lens. The magnification side surface 32 in the third lens 3 is the concave surface, and the reduction side surface 34 is the convex surface. In addition, the parameters such as the optical data and the spacing of each of the elements of the first lens 1, the second lens 2, the third lens 3, and the fourth lens 4 are not completely the same.

In the third embodiment of the disclosure, EFL of the optical lens OL is 16.80 mm. The F-number (F #) is 1.40. The field of view (FOV) is 30.8 degrees. TTL is 60.2 mm. The maximum image height is 4.4 mm. Other detailed optical data of the optical lens OL in the third embodiment of the disclosure are shown in Table 3 below.

TABLE 3

The third embodiment

| Serial numbers of surfaces | Radius of curvature (mm) | Spacing/ thickness (mm) | Refractive index | Abbe number | radius (mm) | Remark |
|---|---|---|---|---|---|---|
|  | infinite | 11.212 |  |  | 6.00 | aperture 0 |
| 12 | −9.500 | 7.000 | 2.00 | 29.10 | 7.92 | first lens 1 |
| 14 | −13.379 | 0.100 |  |  | 11.48 |  |
| 22 | −715.363 | 4.247 | 2.00 | 29.10 | 12.77 | second lens 2 |
| 24 | −36.924 | 2.902 |  |  | 12.99 |  |
| 32 | −19.899 | 6.620 | 2.00 | 29.10 | 12.92 | third lens 3 |
| 34 | −26.905 | 0.100 |  |  | 15.09 |  |
| 42 | 24.366 | 6.088 | 2.00 | 29.10 | 15.24 | fourth lens 4 |
| 44 | 84.210 | 14.761 |  |  | 14.52 |  |
| 52 | infinite | 7.157 |  |  | 6.898 | prism 5 |
| 54 | infinite | 0.050 |  |  | 4.707 |  |
| IP | infinite | 0.000 |  |  | 4.404 | light source E | in this embodiment, LT is 27.057 mm. The ratio of EFL to LT is 0.621. In this embodiment, the ratio of the inner diameter of the aperture 0 to the diameter of the third lens 3 is 0.398. In addition, in this embodiment, the refractive indices of the first lens 1, the second lens 2, the third lens 3, and the fourth lens 4 are all greater than 1.6, and the refractive indices of the first lens 1, the second lens 2, the third lens 3, and the fourth lens 4 are all greater than 1.9.

Referring to FIGS. 6A and 6B, the field curvature aberration in FIG. 6A indicates that the field curvature aberration of the wavelength in the entire field of view falls within ±35 The distortion aberration in FIG. 6B shows that the distortion aberration of the third embodiment is maintained within the range of ±5%. In light of the above, in this embodiment, the optical performance is still good when the number of lenses is reduced to 4, and the system length is shortened to 60.2 mm.

The relevant optical values of the optical lens OL in this embodiment are listed in detail in Table 4 attached later.

Table 4 lists the relevant optical values of the optical lens OL from the first embodiment to the third embodiment. A unit of each of the parameters from the row of "EFL", the row of "TTL" to the row of "maximum image height" and from the row of "FWD" to the row of "LT" is millimeter (mm). A unit of the column of "FOV" is degree.

TABLE 4

|  | The first embodiment | The second embodiment | The third embodiment |
|---|---|---|---|
| EFL | 16.75 | 16.86 | 16.80 |
| F# | 1.40 | 1.41 | 1.40 |
| FOV | 30.8 | 30.8 | 30.8 |
| TTL | 60.0 | 60.2 | 60.2 |
| Maximum image height | 4.4 | 4.4 | 4.4 |
| Lens configuration | negative, positive, positive, positive | positive, negative, positive, positive | negative, positive, negative, positive |
| FWD | 10.679 | 8.440 | 11.212 |
| BFL | 22.743 | 17.766 | 21.968 |
| LT | 26.577 | 33.992 | 27.057 |
| EFL/LT | 0.630 | 0.496 | 0.621 |
| FWD/LT | 0.402 | 0.248 | 0.414 |

The optical lens OL in each of the embodiments of the disclosure may have a telecentric characteristic at the reduction side of the optical lens OL, and may be used as a collimator lens or an optical connector to collimate the divergent light source to project an image. The optical lens OL may be used, for example, in an in-vehicle application device, but the disclosure is not limited thereto. The optical lens OL in each of the embodiments of the disclosure may be used as the collimator lens for the light source of long wave band (for example, infrared light), and may provide the appropriate optical lens for the light source applied to environment sensing. However, the disclosure is not limited thereto.

Based on the above, the optical lens in each of the embodiments of the disclosure is substantially formed by the four lenses, which reduces the number of required lenses, but still maintains good optical performance. Therefore, the effect of light weight may be achieved, and the coupling efficiency may also be improved, and the tolerance sensitivity may be reduced. The optical lens in each of the embodiments of the disclosure may have the shorter system length to facilitate integration and configuration with related equipment. The optical lens in each of the embodiments of the disclosure is formed by the glass lens, which may meet higher temperature and strength requirements. In addition, the optical lens in each of the embodiments of the disclosure has the less F-number, and may receive and transmit more energy.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An optical lens, sequentially in a direction, comprising:
    an aperture;
    a first lens;
    a second lens, wherein one of the first lens and the second lens has positive refracting power, and the other has negative refracting power;
    a third lens having refracting power and being a lens with a largest diameter in the optical lens; and
    a fourth lens having the refracting power,
    wherein the optical lens meets a condition: a ratio of EFL to LT ranges between 0.45 and 0.65, wherein EFL is an effective focal length of the optical lens, and LT is a length of the optical lens on an optical axis;
    a ratio of an inner diameter of the aperture to an diameter of the third lens ranges between 0.3 and 0.5;
    the four lenses are all made of glass;
    for light with a wavelength of 1315 nm, a transmittance of the optical lens is greater than ninety percent.

2. The optical lens according to claim 1, wherein a distance from the aperture to the first lens is greater than 7 mm.

3. The optical lens according to claim 1, wherein the optical lens meets the condition: a ratio of the distance from the aperture to the first lens to LT ranges between 0.2 and 0.6.

4. The optical lens according to claim 1, wherein the optical lens meets the condition: LT ranges between 25 mm and 35 mm.

5. The optical lens according to claim 1, wherein the optical lens meets the condition: TTL ranges between 55 mm and 65 mm, wherein TTL is a distance from the aperture to an imaging plane of the optical lens.

6. The optical lens according to claim 1, wherein a distance from the fourth lens to an imaging plane of the optical lens is greater than 7 mm.

7. The optical lens according to claim 1, wherein the optical lens meets the condition: an F-number of the optical lens is greater than or equal to 1.4.

8. The optical lens according to claim 1, wherein the four lenses comprise three lenses with refractive indices greater than 1.6.

9. The optical lens according to claim 1, wherein a maximum image height of the optical lens is 4.4 mm.

10. The optical lens according to claim 1, wherein a field of view (FOV) of the optical lens is between 50 degrees and 20 degrees.

11. An optical lens, sequentially along a direction, comprising:
an aperture, a first lens, a second lens, a third lens, and a fourth lens,
wherein the four lenses are made of glass, and all have refracting power, one of the first lens and the second lens has positive refracting power, and the other has negative refracting power;
a distance from the aperture to the first lens is greater than 7 mm;
a ratio of an inner diameter of the aperture to an diameter of the third lens ranges between 0.3 and 0.5;
for light with a wavelength of 1315 nm, a transmittance of the optical lens is greater than ninety percent,
wherein the optical lens meets a condition: a ratio of EFL to LT ranges between 0.45 and 0.65, EFL is an effective focal length of the optical lens, and LT is a length of the optical lens on an optical axis.

12. An optical lens, sequentially along a direction, comprising:
an aperture, a first lens, a second lens, a third lens, and a fourth lens,
wherein the four lenses are made of glass, and all have refracting power, one of the first lens and the second lens has positive refracting power, and the other has negative refracting power;
a distance from the aperture to the first lens is greater than 7 mm;
a ratio of an inner diameter of the aperture to an diameter of the third lens ranges between 0.3 and 0.5;
for light with a wavelength of 1315 nm, a transmittance of the optical lens is greater than ninety percent,
wherein the optical lens meets a condition: a ratio of the distance from the aperture to the first lens to LT ranges between 0.2 and 0.6, LT is a length of the optical lens on an optical axis.

13. The optical lens according to claim 11, wherein the optical lens meets a condition: LT ranges between 25 mm and 35 mm.

14. The optical lens according to claim 11, wherein the optical lens meets a condition: TTL ranges between 55 mm and 65 mm, TTL is a distance from the aperture to an imaging plane of the optical lens.

15. The optical lens according to claim 11, wherein a distance from the fourth lens to an imaging plane of the optical lens is greater than 7 mm.

16. The optical lens according to claim 11, wherein the four lenses comprise three lenses with refractive indices greater than 1.6.

17. The optical lens according to claim 11, wherein the optical lens is a telecentric at an end of the optical lens adjacent to the fourth lens.

18. The optical lens according to claim 11, wherein a focal length of the optical lens at the wavelength of 1315 nm ranges between 16 mm and 25 mm.

19. The optical lens according to claim 11, wherein the number of lenses in the optical lens is four.

20. The optical lens according to claim 12, wherein the optical lens meets a condition: LT ranges between 25 mm and 35 mm.

* * * * *